June 30, 1959   W. L. MORRISON   2,892,564
SHIPPER CONTAINER
Filed April 10, 1957

INVENTOR.
WILLARD L. MORRISON
BY PARKER & CARTER
ATTORNEYS

2,892,564
SHIPPER CONTAINER

Willard L. Morrison, Lake Forest, Ill., assignor to The Union Stock Yard and Transit Company of Chicago, Chicago, Ill., a corporation of Illinois Application April 10, 1957, Serial No. 651,986

1 Claim. (Cl. 220—15)

My invention relates to improvements in shipper containers and has for one object to provide a light weight container insulated with such porous light insulation as Santocel and wherein the contents of the container remain under adequate insulation even though the insulating material compacts and settles.

Other objects will appear from time to time in the course of the specification and claim.

My invention is illustrated more or less diagramatically in the accompanying drawings, wherein—

Like parts are indicated by like characters throughout the specification and drawings.

Figure 1:
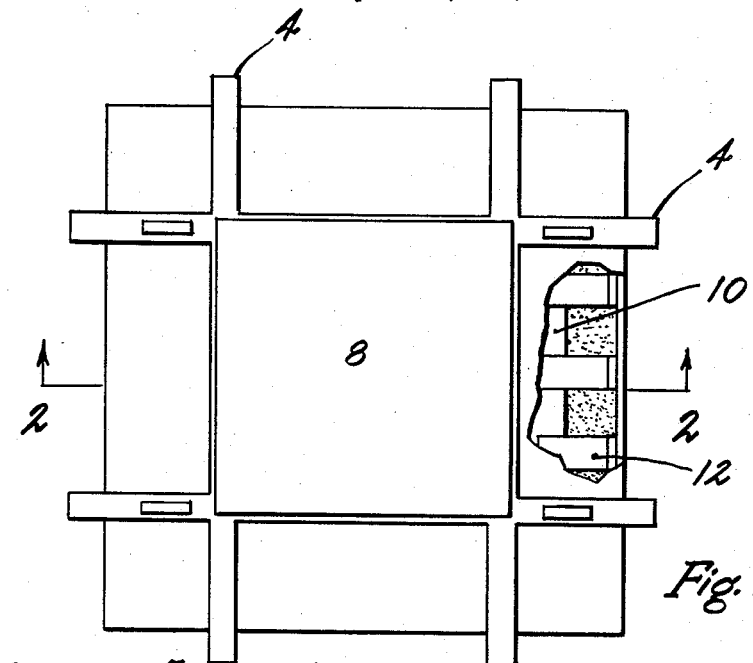
Figure 1 is a plan view with parts broken away.
Figure 2:
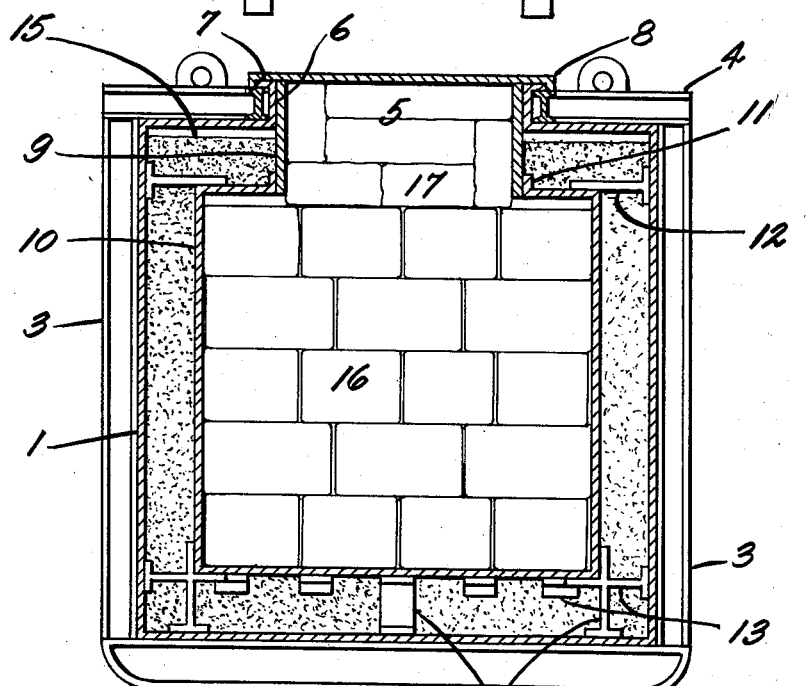
Figure 2 is a section along the line 2—2 of Figure 1.

A generally rectangular, lightweight, metallic outer housing 1 is reinforced by bottom skids 2, vertical uprights 3, cross beams 4. The cross beams 4 define a filling opening or port 5. The top of the housing extending inwardly from the side walls underlies the cross beams 4 and extends upwardly as a collar 6, surrounding the filling opening 5 and flanged at 7 to overlie the cross beams 4. A removable cover 8 closes the opening 5.

A flexible fabric sleeve 9 of strong non-heat conducting material extends downwardly from, is rigidly attached to and conforms to the shape of the collar 6. A liner 10 apertured at the top in register with the port 5 is rigidly attached to the sleeve 9, the open top being flanged at 11 for that purpose. Thus the liner hangs from the cross beams.

Flexible, non-heat conducting fabric webs or stays 12 and 13 extend generally horizontally under tension between housing and liner walls, are permanently attached to the walls, and together with similar webs 14 between the bottom of the housing and the bottom of the liner and the sleeve 9 center the liner in the housing.

Loose insulating material such as Santocel or the like fills the space between the housing and the liner and extends above the level of the liner top so that as the Santocel tends to settle in the reservoir area indicated by 15, as it well may, the clearance or void left by the settling will be localized at the top of the housing in arear 15 away from the periphery of the liner and safely above the level of the food. The heat having access only to the insulated pillows 17 which protect the food from heat infiltration.

The material to be stored indicated at 16 is contained within the liner and loose insulating pillows 17 may be thrown onto the material to fill the space within the sleeve so that if the insulation does shrink, it will not leave the liner exposed to ambient temperature.

The space between the top of the liner and the top of the housing is slightly greater than the space between side and bottom walls so that as insulation settles and a gap develops between the top of the insulation mass and the top of the housing, the insulation thickness above the liner will still remain in the order of thickness of the rest of the insulation.

I claim:

A shipper container including an outer metallic ported shell, rigid reinforcing structural elements outside of and reinforcing the shell, a liner loosely suspended within the shell and spaced therefrom, ported in register with the shell, flexible, non-conducting supporting elements interposed between the liner and shell at side and bottom, a flexible, non-conducting sleeve coextensive with the ports anchored at bottom on the liner and at top on the shell, a removable cover for the port in the shell, pulverulent flowing insulation completely filling the space between the sides and bottom of shell and liner and in communication with the space encircling the port between the liner and shell, there being free communication between all the spaces interposed between the shell and the liner, the pulverulent material being of substantial depth above the liner about the shell and free to flow downwardly into the space between the side walls of liner and shell, removable insulating pillows filling the space between the cover and the top of the liner.

References Cited in the file of this patent

UNITED STATES PATENTS

| | | |
|---|---|---|
| 883,479 | Place | Mar. 31, 1908 |
| 1,071,817 | Stanley | Sept. 2, 1913 |
| 2,329,765 | Jackson et al. | Sept. 21, 1943 |
| 2,426,525 | Rundell | Aug. 26, 1947 |
| 2,526,036 | Morrison | Oct. 17, 1950 |
| 2,655,255 | Brown | Oct. 13, 1953 |